KILBURN & HAINES.
Seed Planter.
No. 3,870.
Patented Dec. 31, 1844.
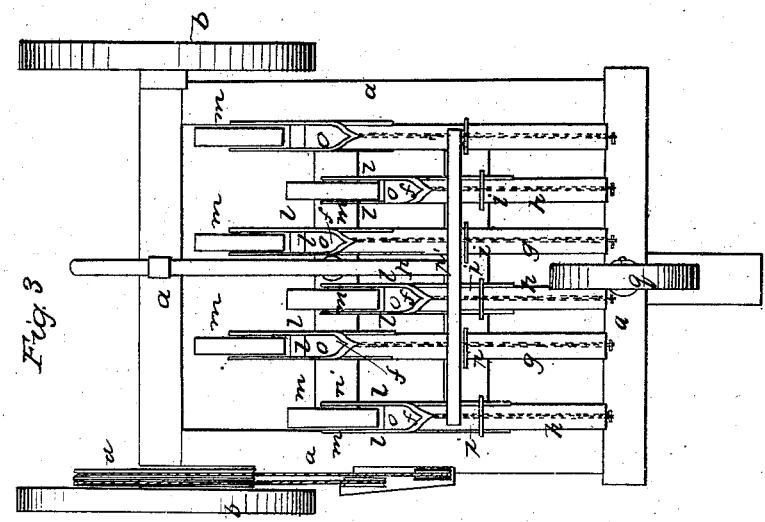
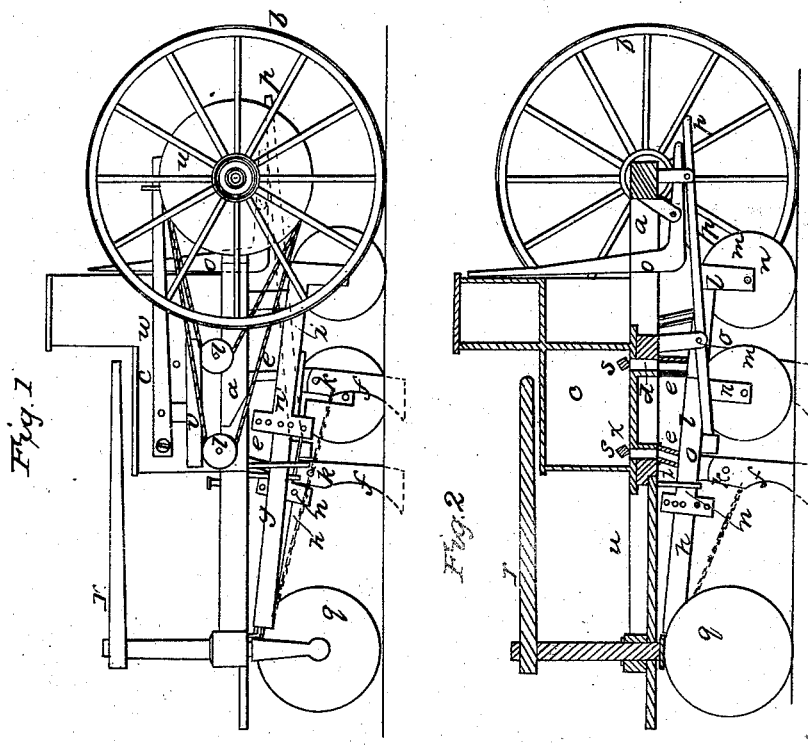

UNITED STATES PATENT OFFICE.

W. KILBURN, OF LAWRENCEVILLE, AND F. HAINES, OF MARIETTA, PA.

IMPROVEMENT IN SEED-PLANTERS.

Specification forming part of Letters Patent No. 3,870, dated December 31, 1844.

*To all whom it may concern:*

Be it known that we, W. KILBURN, of Lawrenceville, and FREDRICK HAINES, of Marietta, in the State of Pennsylvania, have invented a new and useful Improvement in Seed-Planting Machines; and we do hereby declare that the following is a full, clear, and exact description thereof, reference being had to the accompanying drawings, which form a part of this specification, in which—

Figure 1 is a side elevation. Fig. 2 is a vertical section. Fig. 3 is a plan of the bottom.

The nature of our invention consists in constructing a machine for planting that presents a row of adjustable teeth and covering wheels or rollers in a frame on wheels, which frame supports a seed box or boxes in which are revolving shafts or seed-distributers, as hereinafter described.

The construction is as follows: An oblong frame, $a\,a$, (most plainly shown in Fig. 3,) is supported at its hinder end by a pair of wheels, $b$, and has a seed-box, $c$, on it about half-way between the two ends, that extends across the machine from side to side, through the bottom of the seed-box $c$. Through the bottom of the seed-box $c$, on the front and back sides, are cracks $d$ over each tooth, the size of which is regulated by slides $x$. (Seen at the front and back sides of the box.) These cracks are contracted in length and widened as they descend till they form a hole on the bottom of the frame, where the tubes $e$ are attached, which tubes enter holes made in the top of each tooth that extends down through it. The tubes are flexible and are not joined to the teeth $f$, so that the teeth can move up and down, as presently described.

To the front bar of the frame $a$ are jointed a row of beams, every other one, $g$, of which is longer than the others, $h$. Intermediate and at their ends the teeth $f$ above spoken of are attached. This allows them to play up and down, turning on the joint that connects the beams to the frame, said beams being guided and steadied by the staples $i$, fastened to the frame about half-way between the two ends of the beam and embracing it. The teeth on the beams $g$ receive the tubes at the back of the box, and those on beams $h$ from the front. They are all made with a joint in them a little below the beam, as at $k$, Figs. 1 and 2, and are kept in place by a brace-chain that runs from the tooth below the joint to the front end of the beam. The attachment here should be weaker than elsewhere, so that when the tooth meets an obstacle the chain gives way and leaves the tooth free to turn up before the tooth will break. On each side of each of the beams are two plates, $l$, which extend back beyond the end of the beam and turn down at right angles, as shown in Fig. 2, and between them a wheel, $m$, is put, the axle of which passes through the plates. They are fastened to the beam by a bolt, $n$, passing through both and near the hind end of said beam. The front ends of the plates, which lie alongside of the beam, have a piece vertically across them at right angles thereto, which is pierced with a row of holes, as shown in the drawings, Fig. 2, $n'$. There is also a hole through the beam at this point, and when the wheel is to be raised or lowered it is done by bringing one of the holes $n'$ opposite that through the beam, by which means the depth the teeth are to run is gaged. All the teeth can be raised out of the ground by bearing down a bent lever, $o$, attached to the back of the frame, which acts on a horizontal lever, $p$, that runs under the frame, and has a T-head, $p'$, on its forward end, that passes under all the beams. The fulcrum of the lever $p$ is under the seed-box. By bearing down the back end of this lever the front end is raised, and the beams and teeth along with it.

There is a single wheel, $q$, at the center of the forward end of the frame, with a swivel motion, and connected with an arm, $r$, above the frame, by which the machine is directed. The hind wheels can, as a modification of this plan, be set in the middle of the frame, on each side, and the forward wheel dispensed with by adding shafts or thills to support the frame in front. Over the cracks $d$, before described, in the seed-box there are two rods or shafts, $s$, that run from side to side and project at one end beyond the box, where a pulley, $t$, is attached to each, as represented in Fig. 1. These pulleys are connected by a band with a larger pulley, $u$, on the inside of the wheel $b$. When these revolve they stir the grain in the hopper or seed-box and cause it to fall through the cracks; but if they are stopped no seed drops. The stopping is effected by a break, $v$, that bears on the small pulleys $t$ by means of a hand-lever, $w$, to which it is attached.

The joints in the teeth and the trace-chains may be dispensed with by fastening the beams *g* and *h* in front with a wooden pin, which pin, when the tooth catches, will be broken, and the beam, with the tooth and wheel, will be detached.

The brake *v* and lever *w* may be dispensed with by using slides operated by a lever to close the cracks in the bottom of the hopper.

Having thus fully described our invention and its operation, what we claim therein as new, and desire to secure by Letters Patent, is—

The combination of a series of cultivator-teeth with the adjusting-rollers and frame, as herein described, said teeth being jointed and adjustable, and the whole constructed and arranged substantially in the manner and for the purpose herein set forth.

WELLS KILBURN.
FRED. HAINES.

Witnesses:
JACOB GRAYBILL,
JOHN AUXER.